US006104873A

United States Patent [19]
Chao et al.

[11] Patent Number: 6,104,873
[45] Date of Patent: *Aug. 15, 2000

[54] USE OF LANGUAGE INSTRUCTIONS AND FUNCTIONS ACROSS MULTIPLE PROCESSING SUB-ENVIRONMENTS

[75] Inventors: Tian-Jy Chao, Brewster; Mark D. Cooper, Poughkeepsie; Colette A. Mastrangelo, Fishkill; Sarat Vemuri, Poughkeepsie, all of N.Y.

[73] Assignee: International Business Machines Corporation, Armonk, N.Y.

[ * ] Notice: This patent is subject to a terminal disclaimer.

[21] Appl. No.: 09/018,008

[22] Filed: Feb. 3, 1998

[51] Int. Cl.[7] .................................................... G06F 9/445
[52] U.S. Cl. ......................... 395/701; 709/108; 709/300; 709/305
[58] Field of Search ................................... 395/701, 702, 395/703, 704, 710; 709/106, 108, 300, 304, 305; 712/228

[56] References Cited

U.S. PATENT DOCUMENTS

| | | | |
|---|---|---|---|
| 4,006,465 | 2/1977 | Cross et al. | 395/856 |
| 4,408,274 | 10/1983 | Wheatley et al. | 364/200 |
| 5,481,712 | 1/1996 | Silver et al. | 395/701 |
| 5,481,719 | 1/1996 | Ackerman et al. | 395/678 |
| 5,511,194 | 4/1996 | Shirakata et al. | 395/674 |
| 5,519,862 | 5/1996 | Schaeffer et al. | 395/701 |
| 5,522,072 | 5/1996 | De Bruler | 395/684 |
| 5,606,696 | 2/1997 | Ackerman et al. | 395/678 |
| 5,628,016 | 5/1997 | Kukol | 395/704 |
| 5,659,701 | 8/1997 | Amit et al. | 395/684 |
| 5,694,539 | 12/1997 | Haley et al. | 395/704 |
| 5,826,087 | 10/1998 | Lohmann | 395/705 |

OTHER PUBLICATIONS

Banda et al., "Exception Management Algorithm for Multi-Threaded Method Invocation," IBM Technical Discolsure Bulletin, vol. 37, No. 07, 07/94 pp. 145–146.

Hidalgo et al. "Method for Creating a Portable C-Language Address Validation Function, " IBM Technical Disclosure Bulletin, vol. 37, No. 11, 11/94, pp. 223–224.

C. R. Merritt, "Backtracking Interpreter, " IBM Technical Disclosure Bulletin, vol. 38, No. 02, 02/95, pp. 625–626.

Jensen et al.,"Address Validation Procedure, " vol. 39, No. 03/96, pp. 21–22.

P. E. Havercan, "High Performance Allocation of Automatic Storage for Multi–CSECT Modules, " IBM Disclosure Bulletin vol. 37, No. 06A. 06/94., pp. 131–132.

Boone, "Java Essentials for C and C++ Programmers'" Addison–Wesley, 1996,pp 31–32.

Microsoft Press "computer Dictionary", 1994, pp 56.

Wong et al., "Exception Handling in C++ Without Language Extension", IEEE TENCON , 1993, pp. 411–414.

stewart et al., "Mechanisms for Detecting and Handling Timing Errors", Comm. of the ACM, Jan. 1997, vol. 40 No. 1, PP 87–93.

Primary Examiner—Tariq R. Hafiz
Assistant Examiner—Kakali Chaki
Attorney, Agent, or Firm—Lily Neff, Esq.; Heslin & Rothenberg, P.C.

[57] ABSTRACT

An apparatus allowing a pair of interrelated C language operations, in particular a setjmp/longjmp and a signal/raise functions to be completed across a plurality of load modules. Upon the issuance of a first instruction or function, such as a setjmp, all information pertaining to the current running processing sub-environment that has been established by a first load module is saved in the memory in any location. Later, upon the issuance of a second and complementary instruction or function, such as a longjmp, issued from a different processing sub-environment established by a different load module, the computer's system stack is searched until the entry for the original processing environment is found. Then once it is established which initial environment the second instruction or function is related to, that information is retrieved from the previously stored memory location and the instruction or function is completed successfully.

22 Claims, 3 Drawing Sheets

USE OF LANGUAGE INSTRUCTIONS AND FUNCTIONS ACROSS MULTIPLE PROCESSING SUB-ENVIRONMENTS

FIELD OF INVENTION

The present invention is generally directed to a method of executing certain language instruction and functions across multiple load modules or processing sub-environments, and more particularly to a method of using setjmp()/longjmp() and signal()/raise() instructions for C language across multiple sub-environments created by different load modules.

BACKGROUND OF THE INVENTION

C is a general purpose programming language which features economy of expression and a rich set of operators. Because of its absence of restrictions and its generality, it has become a programming language of choice for many tasks even over more powerful languages. Since its introduction, C language has been growing at a fast pace in popularity. Many different compilers are developed for this same purpose. The introduction of varied compilers and the changes to the language over the years led to a need for a common language standard. In 1983, The American National Standards Institute (ANSI) established a committee whose goal was to produce a machine-independent definition of the language. The result is the ANSI standard for C.

C language provides for statement groupings, decision makings, selection of different set of possible cases, looping and termination of a test at the top or bottom, early loop exits and other required control-flow constructions. As a result, however, the program can have layers and be nested. Nesting is the allowing one or more structures of one kind into a structure of the same kind. For example a loop can be nested within another loop or a subroutine can be nested within a different subroutine. This method usually is used to allow the completion of programs of different hierarchial level and allow the recursive accessing of data. C language also allows for function calls. A function call generally is an expression that moves the path of execution from the current function to another specified function as well as evaluating to the return value provided by the called function. A function call contains the name of the function to which control moves and a parenthesize list of values. Function calls can also be nested.

Many compilers and other Unix based processors that utilize C language have developed the idea of using load modules for multi-processor environments. A load module is all or a part of a computer program in a form suitable for loading into main storage for execution. A load module is usually the output of a linkage editor and contains all the links that need to be made during the execution. It is possible to have more than one load module executing at one time with today's computers, each providing a distinct processing environment than one another.

It is desirable to have instructions and functions that can operate across different processing environment and especially across processing load modules when running a programming language such as C language. There are several instructions and functions like setjmp/longjmp and signal/raise that are ANSI standard C language instructions and functions but cannot operate across different load modules and processing environment. Setjmp and longjmp allow the user to do a non-local goto across nested function calls within a single C load module.

Similarly, signal and raise allow the user to activate a signal handler within a single C load module. These functions do not work across multiple C load modules (especially not the Dynamic Link Library or DLLs) at present. For example, on MVS operating system, a signal handler can only be coded within the same C load module that issued the signal and raise command. Some efforts have been made to allow some transferability when the second load module is a DLL. However, when using a DLL, extensive efforts have to be utilized to package all data sent as a DLL package which takes away from the ease of use and flexibility desired in such instances.

This application is being filed at the same day as related application Ser. No. 09/018,205, attorney docket PO997117.

SUMMARY OF THE INVENTION

An object of the present invention is to provide a tool that can allow a user of C language load modules to perform certain ANSI standard C language operations across load modules.

Another object of the present invention is to provide a tool that can allow transferability of instructions and functions across C language load modules and processing sub-environments without the restrictions posed by a DLL, thus allowing such transfer to be flexible and easy to implement.

In accordance with one embodiment of the present invention, in a computer environment using C programming language, an apparatus allowing a pair of C language instructions and/or functions to be completed across a plurality of sub-environments is introduced. Upon the issuance of a first instruction or function, all information pertaining to the current running processing sub-environment established by a first load module's is saved a memory location. Processing is then continued and alternate processing sub-environments are established. Whenever a second and complementary instruction or function is issued, the computer's system stack is searched for the name of the initial environment associated with this second complementary command. Once the environment is identified, all previously stored information pertaining to that environment is retrieved and the environment is recreated if needed.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
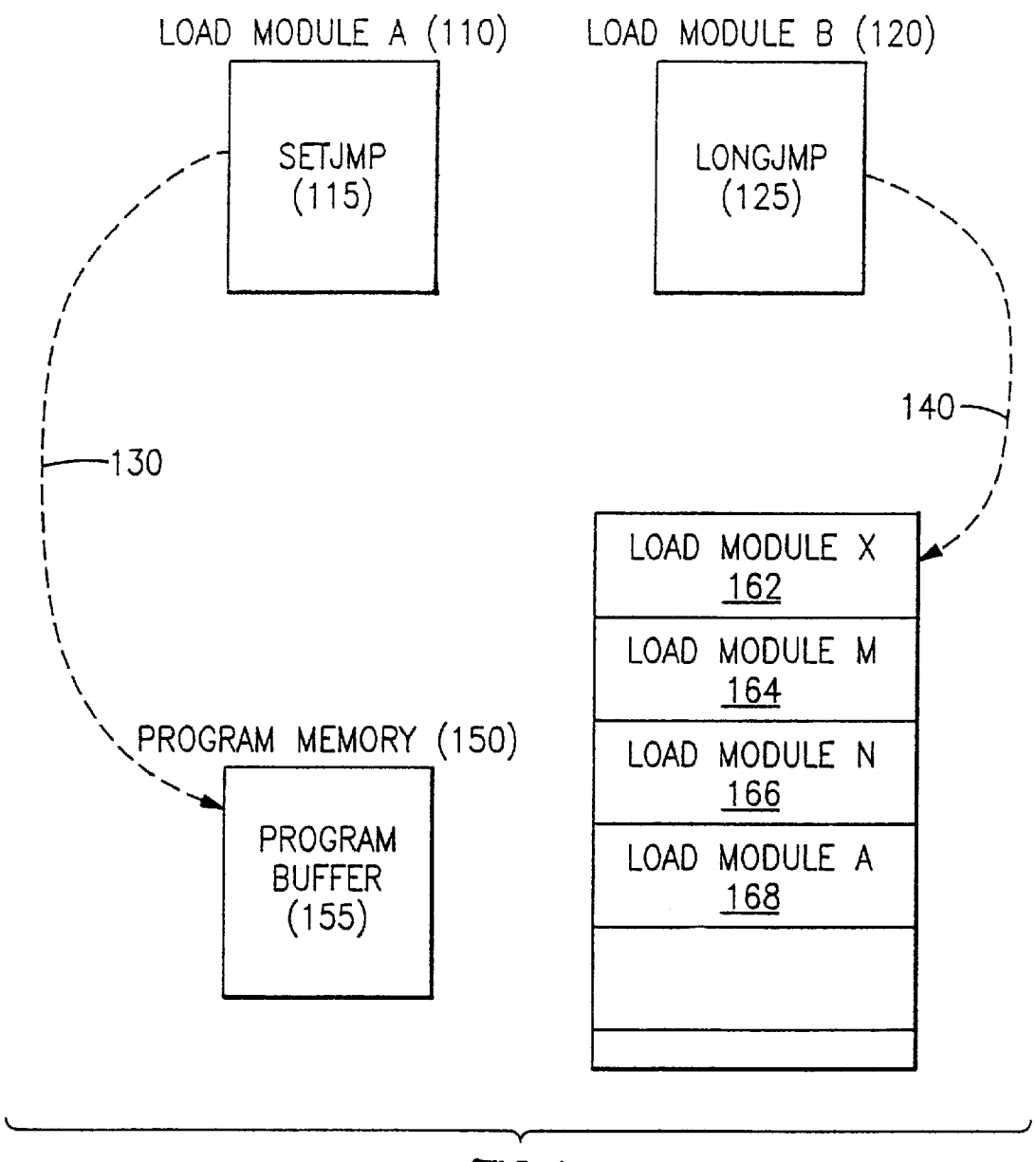
FIG. 1 is a block diagram illustration of the workings of one embodiment of the present invention as it relates to setjmp/longjmp functions.

C language provides both for local and non-local jumps as is known to the person skilled in the art. Generally, the only way to transfer control from one function to another is for the first function to call the second one. An example of this is a goto statement, where it is impossible to jump from one function to another while bypassing the normal call mechanism. However, there are some exceptions to this rule, namely the presence of interfunction jumps. An interfunction jump allows one function to branch directly into the middle of another. Interfunction jumps are included in ANSI standard C to handle a variety of unique and unusual circumstances. As an example, one good use for an interfunction jump is when a catastrophic error occurs in a deeply nested function and when best response to that error is returning to a safe point outside that function and executing what is, in effect, a program reset.

Setjmp and longjmp are two library functions that can be categorized as an interfunction jump. The functions setjmp() and longjmp() work together and setjmp() establishes the point in one function to which longjmp will branch. The setjmp() function does this by saving the current state of the stack and of the CPU registers, and when program wants to jump back to the point where setjmp was called, a longjmp is executed which uses the saved information to set the machine to its previous setting. Execution will resume immediately after the point at which setjmp() was called. (The setjmp() function returns a value of 0 when it is actually called, during which the jump is initialized. If the setjmp() is returning after executing a call to longjmp, its return value must be non-zero.) However, as explained earlier both the setjmp() and longjmp() at the present have to be issued within the same processing environment.

Similarly, a signal and raise instruction or function can work together and be interrelated, although they can also work independently. A signal and raise can at times create an interfunction jump, but they are not exclusively interfunction jump functions. The purpose of a signal() function is to allow a C program to respond to various events generated by the underlying processing environment. Typically these events are provided for handling of exceptional conditions that arise during execution, such as an interrupt signal from an external source or 10 an error in execution. The signal() function is used to route a specific interrupt to its own signal-handling function. A signal handler is usually a routine that controls a program's reaction to the specific signal and other specific external events. A raise() sends the signal back to the program or environment where the signal occurs. Some examples of such signals are SIGABRT, for abnormal termination from an abort; SIGFPE for arithmetic errors like zero divide or overflow; SIGILL for illegal function image such as an illegal instruction; SIGINT for interactive attention such as an interrupt; SIGSEGV for illegal storage access such as an access to outside memory limits; and SIGTERM for termination request sent to this program. A signal once issued within a single load module will return the previous value of a handler for a specific signal, or a SIG_ERR if an error occurs. When a signal sig subsequently occurs, the signal is resorted to its default behavior. Then the signal-handler function is called and if the handler returns, execution will resume where it was when the signal occurred. The initial state of signals are usually implementation defined.

Figure 3:
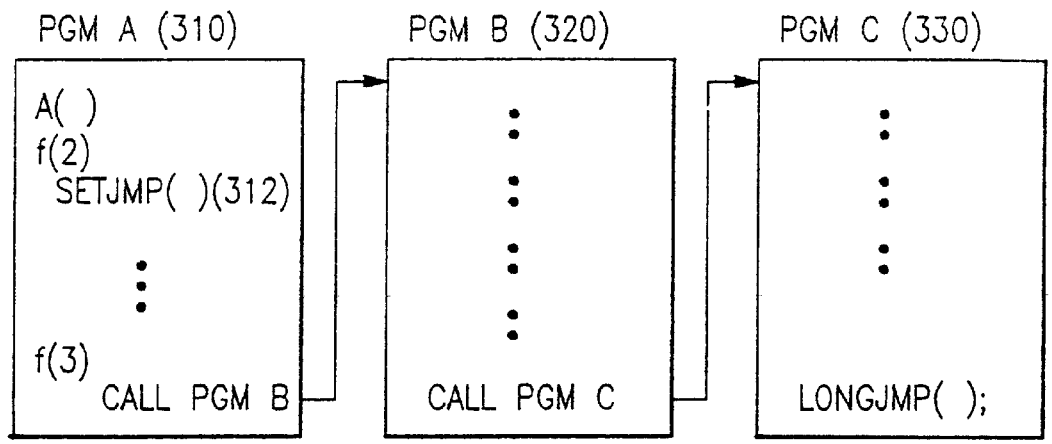
FIG. 3 is another block diagram illustrating the general principles used in the present application.

FIG. 3, illustrates an embodiment of the present invention, allowing both interfunction jumps and other function like signal and raise function to occur and complete during different processing environments. In FIG. 3, as shown at 310, initially a processing sub-environment A is running with an associated transaction, a current stack and an empty Master program stack (shown in FIG. 4). A master program stack saves information of each program module called (or nested) by the caller. A setjmp() is then issued in sub-environment A as shown at 312. At that point not only the current state of the stack and of the CPU registers are saved, preferably in a setjmp() buffer, but writable static pointer information and other information about the environment that has been set up by the load module where the program is running is also saved in a location, preferably in a special buffer like JMPBUF, in the memory. The information to be saved can include information about the stack environment itself, as well as other information about the current program such as the program name, program base address, and subsystem names. The type of information to be saved can be pre-selected to include more or less details and entries.

Figure 4:
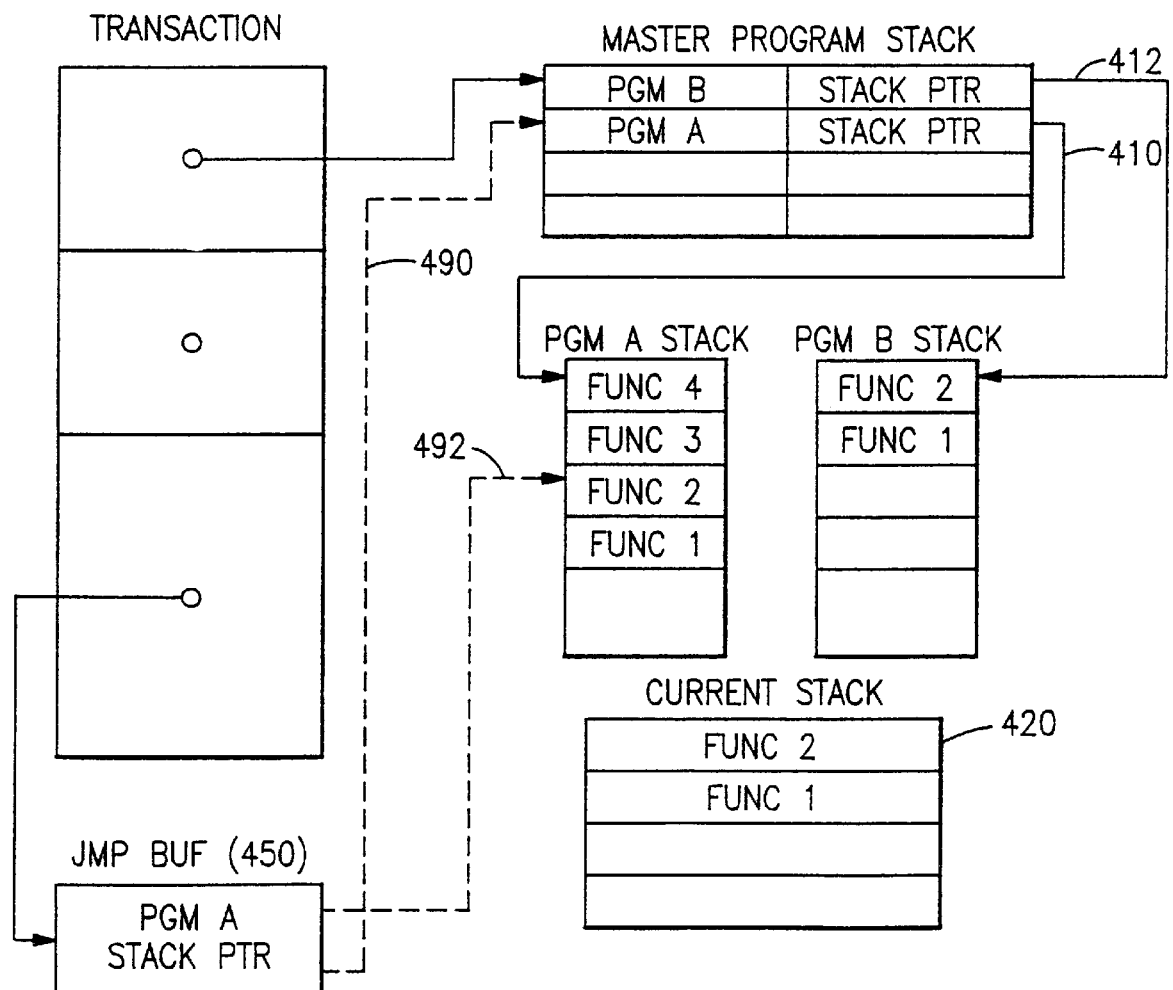
FIG. 4 is an illustration of the workings of the system stack as provided in the present application.

The one of Master program stack entries for PGM A is now updated with a pointer to the sub-environment A's stack as shown in FIG. 4 at 410 and a new Current stack is established for the transaction as shown at 420.

Sub-environment A then continues to run and eventually enter other sub-environments set up by other load modules and/or programs. In the example illustrated in FIG. 3, subenvironment A eventually enters processing sub-environment B as shown at 320. Sub-environment B also eventually enters another processing sub-environment, sub-environment C shown at 330. Again the Master program stack is updated with a pointer to sub-environment B's stack shown in Figure B at 412 and a new Current Stack is established.

A longjmp() is finally issued in sub-environment C, in the embodiment illustrated in FIG. 3. At that point, sub-environment C uses the information stored in the special buffer, shown at FIG. 4 at 450 and identified as JMP buffer. This information will pop the Master program stack until the correct entry is found. Subsequently, the sub-environment A's program stack will be restored as the current stack by the longjmp() operation. Not shown is the rest of sub-environment A's environment information, which is saved and will be restored. References shown as 490 and 492 in FIG. 4 denote that the system is running PGM A and function 2 within PGM A under the current conditions. (A function can be defines as a group of instructions to solve a task.)

FIG. 1 is a block diagram depiction of the present invention as it relates to a setjmp/longjmp function across different load modules. In FIG. 1, the setjmp() function shown as 115 will be issued during the processing environment provided by Load Module A shown as 110, in a stack writable static format. However, as shown in FIG. 1 the longjmp() function shown as 125 is to take effect in a different processing environment, namely that created by Load Module B shown as 120. Once the setjmp() function is issued, the information about that processing information is saved in the program memory. In FIG. 1 this process is depicted graphically. Once the setjmp() function is issued, the information about Load Module A's processing sub-environment will be stored as shown in 130 in the program memory shown at 150, and in a special program buffer shown as 155.

The longjmp() once issued will subsequently be able to setup the correct environment from the information saved in the program memory previously. The longjmp() will search through the information provided in the system stacks at 130 associated with the computing environment, until a match is found at 166. In this way longjmp() will be able to setup the correct environment, in this case that of Load Module A, and branch to the routine that issued the setjmp(), without concern for which load module this particular routine resides in. Consequently, when Load Module A issues a setjmp()

and enters Load Module B, module B is able to issue a longjmp() function and return back to module A having the registers restored, the appropriate program nesting level and the appropriate writable static pointer.

Figure 2:
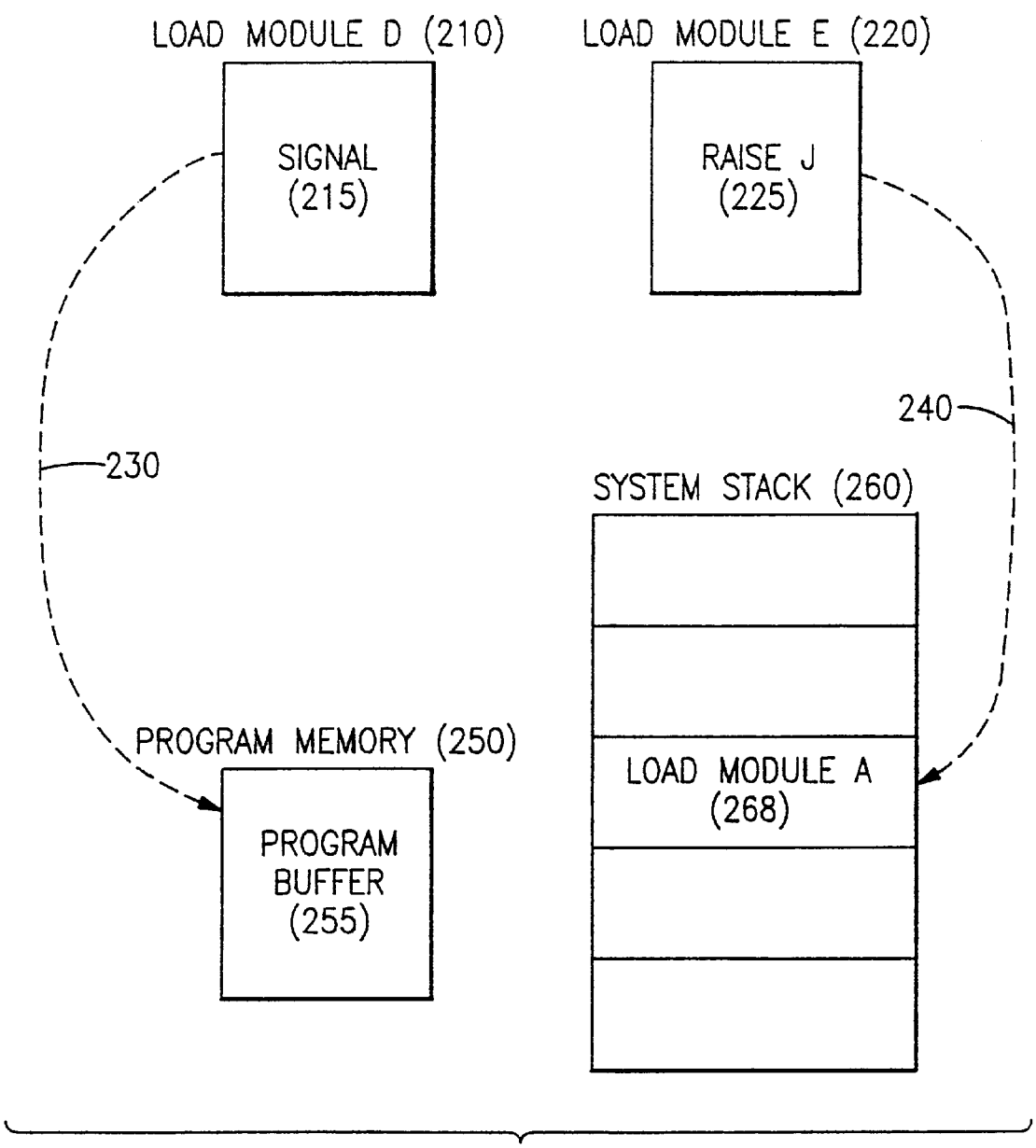
FIG. 2 is another block diagram illustration of the workings of an alternate embodiment of the present invention as it relates to signal/raise functions.

In an alternate embodiment of the present invention shown in FIG. 2, a signal() can be issued as shown at 215 during the processing environment created by load module D at 210, and it can then entar another processing environment shown as load module E at 220 and then return to the its original environment D after a raise() function issued as shown at 225 in the load module E environment. All information pertaining to environment D where the signal occurred will again be stored in the program memory 250. The information stored can include the writable static pointer, program name and subsystem name which will be saved at this point to allow the raise to branch to the handler, regardless of which load module the handler resides in. The raise() function will initiate a search as shown at 240 in the system stack as shown at 260, until a match is found for the initial environment where the signal() was first issued, in this case the entry shown at 268. (It is possible, that a system can have one central signal handling load module. If any other load module had a signal raised, the signal handler in the system signal handling load module can be invoked. This allows a system to have more robust system defaults for signals.)

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. In a computer environment using C programming language, an apparatus for allowing a pair of interrelated C language functions to be completed across a plurality of processing sub-environments, comprising:

a memory location for storing all information pertaining to a first processing sub-environment established by a first load module, upon issuance of a first function of said pair;

a system stack where said computer environment can store and associate said particular processing sub-environment with said first issued function;

said processing continuing and alternate sub-environments being established by different load modules;

means for searching said system stack upon issuance of a second complementary function of said pair, until an entry is found; and means for locating and retrieving information pertaining to said first sub-environment from said memory location so that said second function can be successfully completed.

2. The apparatus of claim 1, further comprising means for recreating said first processing sub-environment, if desired after said information stored is retrieved.

3. The apparatus of claim 1, wherein said system stack comprises a master program stack and a current stack, further comprising:

means for updating said master program stack with a pointer to a previous processing sub-environment every time a new processing sub-environment is introduced; and means for updating said current stack in a way so that in effect a new current stack is established every time a new processing sub-environment is introduced.

4. The apparatus of claim 1, wherein said information about said first processing sub-environment is stored in a special buffer in said memory location.

5. The apparatus of claim 1, wherein said information stored about said first processing sub-environment comprises information about stack environment.

6. The apparatus of claim 1, wherein said information stored about said first processing sub-environment comprises current running program name, any subsystem names, all writable static pointers and register information.

7. The apparatus of claim 6, wherein said sub-environments are nested and said information stored about said first processing sub-environment comprises all appropriate program nesting levels.

8. The apparatus of claim 1, wherein said pair of functions are interfunction jumps.

9. In a computer environment using C programming language, an apparatus allowing completion of a setjmp and longjmp function to be performed across a plurality of load modules, comprising:

a memory for storing all information pertaining to a first processing sub-environment established by a first load module upon issuance of a setjmp function;

a system stack for storing all processing sub-environment's names each time a new processing sub-environment is introduced by a different load module, said stack also reflecting any issued function during each sub-environment;

means for searching said system stack upon receipt of a longjmp function, until an entry pertaining to said first processing sub-environment of said first load module is found; and means for retrieving all information pertaining to said first processing sub-environment from said memory location so that said longjmp function can be completed.

10. The apparatus of claim 9, wherein said system stack comprises a master program stack and a current stack, further comprising:

means for updating said master program stack with a pointer to a previous processing sub-environment every time a new processing sub-environment is introduced; and means for updating said current stack in a way so that in effect a new current stack is established every time a new processing sub-environment is introduced.

11. The apparatus of claim 9, wherein said information about said first processing sub-environment is stored in a setjmp buffer in said memory location.

12. The apparatus of claim 9, wherein said information stored about said first processing sub-environment comprises information about stack environment.

13. The apparatus of claim 12, wherein said information stored about said first processing sub-environment comprises current running program name, any subsystem names, all writable static pointers and register information.

14. The apparatus of claim 12, wherein said sub-environments are nested and said information stored about said first processing sub-environment comprises all appropriate program nesting levels.

15. The apparatus of claim 9, further comprising means for recreating said first processing sub-environment, if desired after said information stored is retrieved.

16. The apparatus of claim 9, wherein said setjmp and longjmp are interfunction jumps.

17. In a computer environment using C programming language, an apparatus allowing completion of a signal and raise functions to be performed across a plurality of load modules, comprising:

a memory for storing all information pertaining to a first processing sub-environment established by a first load module upon issuance of a signal function;

a system stack for storing all processing sub-environment's names each time a new processing sub-environment is introduced by a different load module, said stack also reflecting any issued function during each sub-environment;

means for searching said system stack upon receipt of a raise function, until an entry pertaining to said first processing sub-environment of said first load module is found; and means for retrieving all information pertaining to said first processing sub-environment from said memory location so that said raise function can be completed.

18. The apparatus of claim 17, wherein said information about said first processing sub-environment is stored in a setjmp buffer in said memory location.

19. The apparatus of claim 17, wherein said information stored about said first processing sub-environment comprises information about stack environment.

20. The apparatus of claim 17, wherein said information stored about said first processing sub-environment comprises current running program name, any subsystem names, all writable static pointers and register information.

21. The apparatus of claim 20, wherein said sub-environments are nested and said information stored about said first processing sub-environment comprises all appropriate program nesting levels.

22. The apparatus of claim 21, further comprises means for recreating said first processing sub-environment, if desired after said information stored is retrieved.

* * * * *

UNITED STATES PATENT AND TRADEMARK OFFICE
CERTIFICATE OF CORRECTION

PATENT NO. : 6,104,873
DATED : August 15, 2000
INVENTOR(S) : Chao et al.

It is certified that error appears in the above-identified patent and that said Letters Patent is hereby corrected as shown below:

Col. 4, line 39, delete "defines" and replace with --defined--.

Signed and Sealed this

First Day of May, 2001

Attest:

NICHOLAS P. GODICI

*Attesting Officer*    *Acting Director of the United States Patent and Trademark Office*